United States Patent [19]

Fukasawa et al.

[11] Patent Number: 5,337,192
[45] Date of Patent: Aug. 9, 1994

[54] MAGNETIC RECORDING AND/OR REPRODUCING APPARATUS HAVING TAPE GUIDE CYLINDER OF REDUCED DIAMETER AND INCREASED TAPE WRAP ANGLE

[75] Inventors: Hideki Fukasawa; Shuichi Ota, both of Kanagawa; Hiroshi Okada, Tokyo, all of Japan

[73] Assignee: Sony Corporation, Tokyo, Japan

[21] Appl. No.: 868,127

[22] Filed: Apr. 14, 1992

[30] Foreign Application Priority Data

Apr. 18, 1991 [JP] Japan .................. 3-086420

[51] Int. Cl.$^5$ .............................................. H04N 5/78
[52] U.S. Cl. ..................... 360/10.3; 360/36.1
[58] Field of Search ............... 360/8, 35.1, 9.1, 33.1, 360/55, 36.1, 81, 84, 10.1, 10.3; 358/335, 337

[56] References Cited

U.S. PATENT DOCUMENTS

| 4,510,538 | 4/1985 | Sato et al. .................. 360/84 |
| 4,785,358 | 11/1988 | Ninomiya .................. 358/335 |
| 4,930,031 | 5/1990 | Nagahara et al. .................. 360/107 |

FOREIGN PATENT DOCUMENTS

| 0115699 | 12/1983 | European Pat. Off. . |
| 3840290 | 12/1988 | Fed. Rep. of Germany . |
| 0158791 | 8/1985 | Japan .................. 358/315 |
| 2222718 | 3/1990 | United Kingdom . |

OTHER PUBLICATIONS

Patent Abstracts of Japan, vol. 9292, Nov. 19, 1985, JP60129903 Yutaka, Magnetic Recording and Reproducing Device.
Patent Abstracts of Japan, vol. 7 No. 204, Sep. 9, 1983, JP 58-101578, Oota, Video Signal Recorder.
Patent Abstracts of Japan vol. 011389, Dec. 19, 1987 of JP 62154205 Kenji, Recording and Reproducing Device for Sound Signal.

*Primary Examiner*—Andrew L. Sniezek
*Attorney, Agent, or Firm*—Lewis H. Eslinger; Jay H. Maioli

[57] ABSTRACT

A magnetic recording apparatus comprises a time base compressing portion for causing a video signal to be subjected to time base compression, a recording signal producing portion for forming a recording video signal based on the video signal with compressed time base, a tape guide cylinder, a rotary magnetic head device disposed in the tape guide cylinder, and a recording signal supplying portion for supplying the rotary magnetic head device with the recording video signal, wherein assuming that $\alpha$ represents the diameter of a standard tape guide cylinder employed in a standard apparatus, $\beta$ represents a tape wrapping angle on the standard tape guide cylinder, $\gamma$ represents the revolving speed of a standard rotary magnetic head device disposed in the standard tape guide cylinder, and $\delta$ represents the number of magnetic gap portions of the standard rotary magnetic head device, the diameter of the tape guide cylinder is selected to be $X \cdot \alpha$, where X is a positive number smaller than one, the tape wrapping angle on the tape guide cylinder is selected to be $\beta/X$, the revolving speed of the rotary magnetic head device is selected to be $Z \cdot \gamma$, where X is a positive integer larger than 1 and smaller than 4, and the number of magnetic gap portions of the rotary magnetic head is selected to be $\delta$.

8 Claims, 3 Drawing Sheets

MAGNETIC RECORDING AND/OR REPRODUCING APPARATUS HAVING TAPE GUIDE CYLINDER OF REDUCED DIAMETER AND INCREASED TAPE WRAP ANGLE

BACKGROUND OF THE INVENTION

1. Field of the Invention

The present invention relates generally to magnetic recording and/or reproducing apparatus, and more particularly, to an apparatus having a tape guide cylinder and a rotary magnetic head device disposed in the tape guide cylinder and operative to record by the rotary magnetic head a recording video signal on or reproduce by the rotary magnetic head device a recorded video signal from a magnetic tape running on a periphery of the tape guide cylinder.

2. Description of the Prior Art

A video tape recorder which is used for recording a video signal on a magnetic tape or reproducing a video signal from a magnetic tape on which the video signal is recorded is generally equipped with a tape guide cylinder having a periphery thereof providing a running path for the magnetic tape and a rotary magnetic head device disposed in the tape guide cylinder. The magnetic tape running along the running path is applied to wrap around a part of the periphery of the tape guide cylinder at a predetermined wrapping angle thereon. The tape guide cylinder is divided in the direction of its central axis for forming a stationary portion and a rotary portion arranged along the central axis and the rotary portion is rotated at a predetermined speed relative to the stationary portion. The rotary magnetic head device is attached to the rotary portion of the tape guide cylinder to be positioned between the stationary portion and the rotary portion constituting tape guide cylinder with its magnetic gap portion projecting very slightly from the periphery of the tape guide cylinder and rotated with the rotary portion of the tape guide cylinder for scanning with the magnetic gap portion thereof obliquely, the magnetic tape running on the periphery of the tape guide cylinder during each revolution so as to record signals on the magnetic tape or reproduce signals from the magnetic tape on which the signals are recorded.

In recording signals on the magnetic tape by the use of the tape guide cylinder and the rotary magnetic head device described above, a plurality of record tracks are formed on the magnetic tape to be arranged in parallel with one another to extend at a predetermined angle of inclination to the longitudinal direction of the magnetic tape and one field period segment of a video signal is usually recorded on each record track. The rotary magnetic head device which scans obliquely the magnetic tape running on the periphery of the tape guide cylinder during each revolution is operative to record one field period segment of the video signal on the magnetic tape so as to form each of the record tracks during each revolution in a recording operation and to scan the magnetic tape along each of the record tracks formed thereon so as to read one field period segment of the video signal during each revolution in a reproducing operation.

In connection with the video tape recorder, there have been proposed a number of recording and reproducing systems different from one another in specifications of configuration, recording and reproducing operations, operation control and so on. In a kind of standard video tape recorder according to one of these systems, by way of example, the diameter of a tape guide cylinder is selected to be 40 mm, a wrapping angle of a magnetic tape on the periphery of the tape guide cylinder (hereinafter, referred to as tape wrapping angle) is selected to be 180 degrees, the revolving speed of a rotary portion of the tape guide cylinder (hereinafter, referred to as cylinder revolving speed), namely, the revolving speed of a rotary magnetic head device is selected to be approximately 29.97 rps, and the number of rotary magnetic heads constituting the rotary magnetic head device is selected to be two. This standard video tape recorder is included in a group of video tape recorders having a relatively small tape guide cylinder, and the tape guide cylinder and the rotary magnetic head device employed in the standard video tape recorder are referred to as standard tape guide cylinder and standard rotary magnetic head device, respectively.

Apart from the standard video tape recorder aforementioned, there has been also proposed to constitute to constitute a small-sized video tape recorder which is equipped with a tape guide cylinder having its diameter smaller than that of the standard tape guide cylinder and compatible in operation with the standard video tape recorder. Such a small-sized video tape recorder is required, in view of compatibility with the standard video tape recorder, to satisfy the following two conditions:

(1) The length of each record track formed thereby on a magnetic tape coincides with that of each record track formed on a magnetic tape by the standard video tape recorder.

(2) The period of one field period segment of a video signal recorded thereby on the magnetic tape coincides with that of one field period segment of a video signal recorded on the magnetic tape by the standard video tape recorder.

In this connection, assuming that Ra represents the ratio of the diameter of the tape guide cylinder employed in the small-sized video tape recorder to the diameter of the standard tape guide cylinder, Rb represents the ratio of the tape wrapping angle on the tape guide cylinder employed in the small-sized video tape recorder to the tape wrapping angle on the standard tape guide cylinder, Rc represents the ratio of the cylinder revolving speed in the small-sized video tape recorder to the cylinder revolving speed in the standard video tape recorder, it is required for meeting the above mentioned conditions (1) and (2) that the equations: Ra·Rb=1 and Rb/Rc=1 are satisfied and further that the rotary magnetic head device employed in the small-sized video tape recorder has N (N is an even number larger than two) magnetic gap portions. Accordingly, the small-sized video tape recorder in which the diameter of the tape guide cylinder is selected to be 40 mm·⅔≈26.67 mm, the tape wrapping angle on the tape guide cylinder is selected to be 270 degrees, the cylinder revolving speed is selected to be approximately 44.955 rps, and the rotary magnetic head device with four magnetic gaps portions is employed, may be produced, by way of example, under a condition wherein Ra is determined to be ⅔, each of Rb and Rc is determined to be 3/2 and the number of the magnetic gap portions of the rotary magnetic head device is determined to be four.

In the small-sized video tape recorder thus constituted, since the rotary magnetic head device is required to have four magnetic gap portions, increase compared with the standard video tape recorder, four independent rotary magnetic heads each having a single magnetic gap must be provided if the rotary magnetic head device is composed of plural rotary magnetic heads each having a signal magnetic gap. This raises a problem that it is quite difficult to attach precisely four independent rotary magnetic heads each having a single magnetic gap to the inside of the tape guide cylinder having the small diameter of 26.67 mm. Further, there is another disadvantage that it is also quite difficult to dispose additional rotary magnetic heads used for reproducing the video signal from the magnetic tape in a trick play mode, such as a fast forward reproduction mode (cue reproduction mode), fast reverse reproduction mode (review reproduction mode) or still picture reproduction mode, on the inside of the tape guide cylinder having the small diameter of 26.67 mm, so that a so-called noiseless cue reproduction, noiseless review reproduction or noiseless still picture reproduction can not be obtained.

OBJECTS AND SUMMARY OF THE INVENTION

Accordingly, it is an object of the present invention to provide a magnetic recording and/or reproducing apparatus equipped with a tape guide cylinder having its diameter smaller than that of a standard tape guide cylinder employed in a standard video tape recorder in which the diameter of the standard tape guide cylinder is selected to be, for example, 40 mm, a tape wrapping angle on the standard tape guide cylinder is selected to be, for example, 180 degrees, a cylinder revolving speed is selected to be, for example, approximately 29.97 rps, and a magnetic head device having two magnetic gap portions is provided, which avoids the aforementioned problem and disadvantage encountered with the prior art.

Another object of the present invention is to provide a magnetic recording and/or reproducing apparatus equipped with a tape guide cylinder having its diameter smaller than that of a standard tape guide cylinder employed in a standard video tape recorder in which the diameter of the standard tape guide cylinder is selected to be, for example, 40 mm, a tape wrapping angle on the standard tape guide cylinder is selected to be, for example, 180 degrees, a cylinder revolving speed is selected to be, for example, approximately 29.97 rps, and a magnetic head device having two magnetic gap portions is provided, which is constructed to be compatible in operation with the standard video tape recorder without increasing the number of magnetic gap portions of the rotary magnetic head device.

A further object of the present invention is to provide a magnetic recording and/or reproducing apparatus equipped with a tape guide cylinder having its diameter smaller than that of a standard tape guide cylinder employed in a standard video tape recorder in which the diameter of the standard tape guide cylinder is selected to be, for example, 40 mm, a tape wrapping angle on the standard tape guide cylinder is selected to be, for example, 180 degrees, a cylinder revolving speed is selected to be, for example, approximately 29.97 rps, and a magnetic head device having two magnetic gap portions is provided, in which the rotary magnetic head device is precisely attached to the inside of the tape guide cylinder having the relatively small diameter.

According to the present invention, there is provided a magnetic recording apparatus comprising a time base compressing portion for causing a video signal to be subjected to time base compression at a predetermined compression rate to produce a video signal with compressed time base, a recording signal producing portion for forming a recording video signal based on the video signal with compressed time base, a tape guide cylinder having a periphery thereof providing a running path for a magnetic tape which is applied to wrap around a part of the periphery of the tape guide cylinder at a predetermined wrapping angle, a rotary magnetic head device disposed in the tape guide cylinder with its magnetic gap portions projecting slightly from the periphery of the tape guide cylinder to come into contact with the magnetic tape on the periphery of the tape guide cylinder, and a recording signal supplying portion for supplying the rotary magnetic head device with the recording video signal, wherein assuming that $\alpha$ represents the diameter of a standard tape guide cylinder employed in a standard apparatus for recording by a standard rotary magnetic head a normal recording video signal formed based on a video signal with its time base not having been compressed on the magnetic tape running on the periphery of the standard tape guide cylinder, $\beta$ represents a tape wrapping angle on the periphery of the standard tape guide cylinder, $\gamma$ represents the revolving speed of the standard rotary magnetic head device, and $\delta$ represents the number of magnetic gap portions of the standard rotary magnetic head device, the diameter of the tape guide cylinder is selected to be $X \cdot \alpha$, where X is a positive number smaller than one, the tape wrapping angle on the tape guide cylinder is selected to be $\beta/X$, the revolving speed of the rotary magnetic head device is selected to be $Z \cdot \gamma$, where Z is a positive integer larger than 1 and smaller than 4, and the number of magnetic gap portions of the rotary magnetic head is selected to be $\delta$.

Further, according to the present invention, there is provided a magnetic reproducing apparatus comprising a tape guide cylinder having a periphery thereof providing a running path for a magnetic tape on which a recording video signal formed based on a video signal with compressed time base is recorded and which is applied to wrap around a part of the periphery of the tape guide cylinder at a predetermined wrapping angle, a rotary magnetic head device disposed in the tape guide cylinder with its magnetic gap portions projecting slightly from the periphery of the tape guide cylinder to come into contact with the magnetic tape on the periphery of the tape guide cylinder, a video signal reproducing portion for reproducing the video signal with compressed time base based on the recording video signal read from the magnetic tape by the rotary magnetic head device, and a time base expanding portion for causing the video signal with compressed time base to be subjected to time base expansion at a predetermined expansion rate to produce a reproduced video signal, wherein assuming that $\alpha$ represents the diameter of a standard tape guide cylinder employed in a standard apparatus for reading by a standard rotary magnetic head a normal recording video signal, formed based on a video signal with its time base not having been compressed from a magnetic tape running on the periphery of the standard tape guide cylinder, $\beta$ represents a tape wrapping angle on the periphery of the standard tape guide cylinder, $\gamma$ represents the revolving speed of the standard rotary magnetic head device, and δ represents the number of magnetic gap portions of the standard rotary magnetic head device, the diameter of the tape guide cylinder is selected to be $X \cdot \alpha$, where $X$ is a positive number smaller than one, the tape wrapping angle on the tape guide cylinder is selected to be $\beta/X$, the revolving speed of the rotary magnetic head device is selected to be $Z \cdot \gamma$, where $Z$ is a positive integer larger than 1 and smaller than 4, and the number of magnetic gap portions of the rotary magnetic head is selected to be δ.

In the magnetic recording apparatus constituted as mentioned above in accordance with the present invention, the recording video signal formed based on the video signal which has been subjected to time base compression at the predetermined compression rate is recorded through the rotary magnetic head device on the magnetic tape running on the periphery of the tape guide cylinder under the condition in which the diameter of the tape guide cylinder is selected to be $X \cdot \alpha$, the tape wrapping angle on the tape guide cylinder is selected to be $\beta/X$, the revolving speed of the rotary magnetic head device is selected to be $Z \cdot \gamma$, and the number of magnetic gap portions of the rotary magnetic head is selected to be δ, where $\alpha$ represents the diameter of the standard tape guide cylinder, which is determined to be, for example, 40 mm, $\beta$ represents the tape wrapping angle on the periphery of the standard tape guide cylinder, which is determined to be, for example, 180 degrees, $\gamma$ represents the revolving speed of the standard rotary magnetic head device, which is determined to be, for example, approximately 29.97 rps, and δ represents the number of magnetic gap portions of the standard rotary magnetic head device, which is determined to be, for example, two. Accordingly, the magnetic recording apparatus according to the present invention, which is equipped with the tape guide cylinder having the diameter thereof smaller than that of the standard tape guide cylinder, is constructed to be compatible in operation with the standard apparatus without increasing the number of the magnetic gap portions of the rotary magnetic head device.

Further, in the aforementioned magnetic reproducing apparatus in accordance with the present invention, the reproduced video signal is obtained by causing the video signal with compressed time base, which is obtained based on the recording video signal read by the rotary magnetic head device from the magnetic tape running on the periphery of the tape guide cylinder, to be subjected to time base expansion at the predetermined expansion rate under the condition in which the diameter of the tape guide cylinder is selected to be $X \cdot \alpha$, the tape wrapping angle on the tape guide cylinder is selected to be $\beta/X$, the revolving speed of the rotary magnetic head device is selected to be $Z \cdot \gamma$, and the number of magnetic gap portions of the rotary magnetic head is selected to be δ, where $\alpha$ represents the diameter of the standard tape guide cylinder, which is determined to be, for example, 40 mm, $\beta$ represents the tape wrapping angle on the periphery of the standard tape guide cylinder, which is determined to be, for example, 180 degrees, $\gamma$ represents the revolving speed of the standard rotary magnetic head device, which is determined to be, for example, approximately 29.97 rps, and δ represents the number of magnetic gap portions of the standard rotary magnetic head device, which is determined to be, for example, two. Accordingly, the magnetic reproducing apparatus according to the present invention, which is equipped with the tape guide cylinder having the diameter thereof smaller than that of the standard tape guide cylinder, is constructed to be compatible in operation with the standard apparatus without increasing the number of the magnetic gap portions of the rotary magnetic head device.

Additionally, since the number of magnetic gap portions of the rotary magnetic head device attached to the inside of the tape guide cylinder having the relatively small diameter are not increased compared with the standard apparatus, it is easy to dispose additional rotary magnetic heads used for reproducing the video signal from the magnetic tape in a trick play mode, for example, a cue reproduction mode, review reproduction mode or still picture reproduction mode, in the inside of the tape guide cylinder and therefore a so-called noiseless cue reproduction, noiseless review reproduction or noiseless still picture reproduction can be easily performed.

The above, and other objects, features and advantages of the present invention will become apparent from the following detailed description which is to be read in conjunction with the accompanying drawings.

DESCRIPTION OF THE PREFERRED EMBODIMENTS

Figure 1:
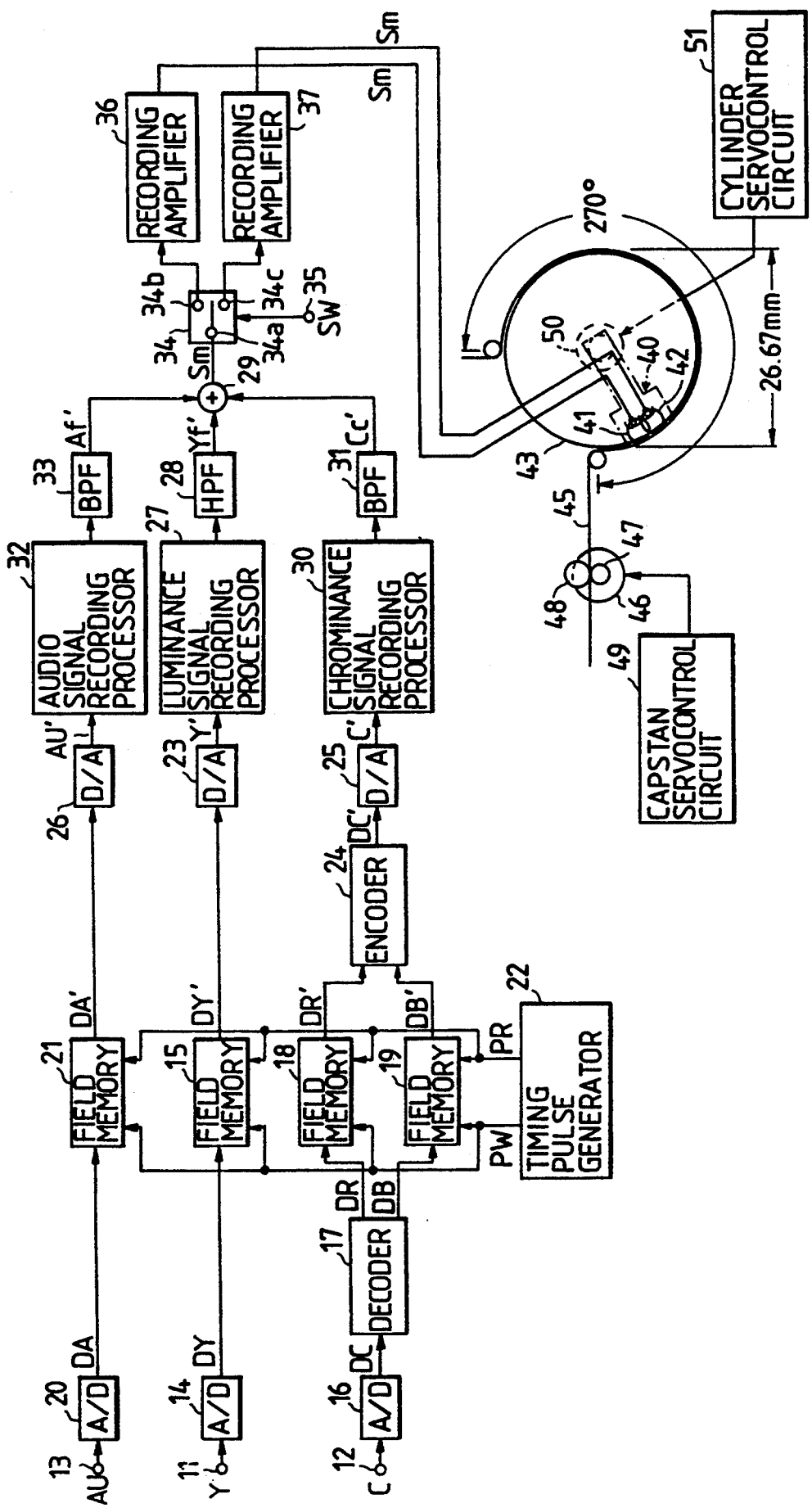
FIG. 1 is a block diagram showing an embodiment a magnetic recording apparatus according to the present invention.

FIG. 1 shows an embodiment a magnetic recording apparatus according to the present invention, which is operative to record a color television signal according to the NTSC system on a magnetic tape, and more concretely, to record a video signal which comprises a luminance signal and a chrominance signal on a magnetic tape, together with an audio signal accompanying the video signal.

Referring to FIG. 1, a luminance signal Y and a chrominance signal C, which constitute a video signal contained in a color television signal according to the NTSC system, are supplied to video signal input terminals 11 and 12, respectively. Further, an audio signal AU contained in the color television signal according to the NTSC system is supplied to an audio signal input terminal 13.

The luminance signal Y from the video signal input terminal 11 is digitalized by an analog to digital (A/D) converter 14 and a digital luminance signal DY is obtained from the A/D converter 14 to be supplied to a field memory 15. The chrominance signal C from the video signal input terminal 12 is digitalized by an A/D converter 16 and a digital chrominance signal DC is obtained from the A/D converter 16 to be supplied to a decoder 17. In the decoder 17, digital color difference signals DR and DB are separately extracted from the digital chrominance signal DC to be supplied to field memories 18 and 19, respectively. The audio signal AU from the audio signal input terminal 13 is digitalized by an A/D converter 20 and a digital audio signal DA is obtained from the A/D converter 20 to be supplied to a field memory 21.

Figures 2A, 2B, 2C, 2D:
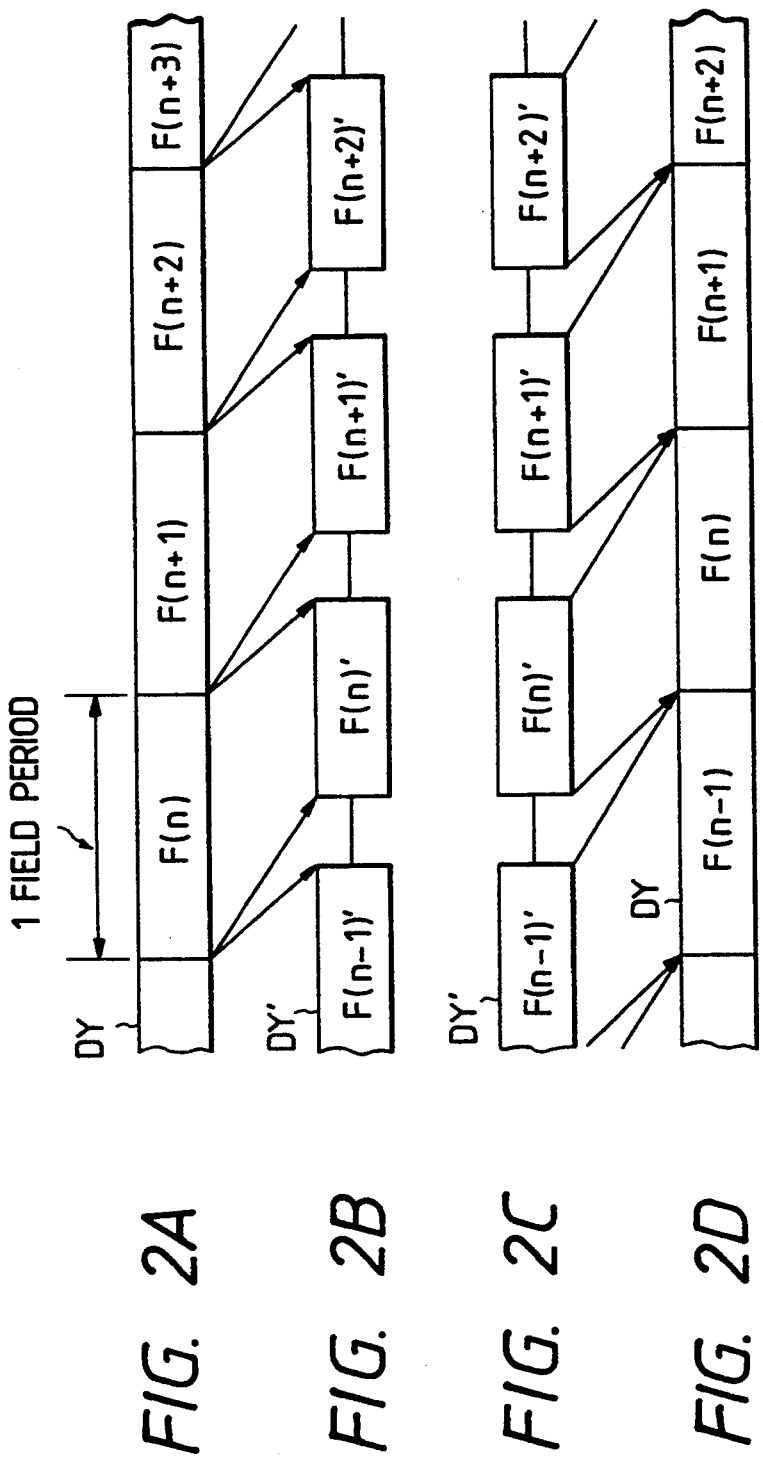
FIGS. 2A to 2D are time charts used for explanation of the operation of embodiments shown in FIGS. 1 and 3.

A writing clock pulse signal PW having a predetermined frequency ft and a reading clock pulse signal PR having a frequency 4·ft/3, both of which are obtained from a timing pulse generator 22, are selectively supplied to each of the field memories 15, 18, 19 and 21. Each of digital field period segments F(n), F(n+1), F(n+2),—of the digital luminance signal DY, as shown in FIG. 2A, is temporarily written in the field memory 15 in accordance with the writing clock pulse signal PW and then read from the field memory 15 in accordance with the reading clock pulse signal PR. Since the frequency 4·ft/3 of the reading clock pulse signal PR is four thirds times as high as the frequency ft of the writing clock pulse signal PW, the digital field period segments F(n), F(n+1), F(n+2),—of the digital luminance signal DY are successively subjected to time base compression at the compression rate of ¾ to produce digital compressed luminance signal segments F(n−1)', F(n)', F(n+1)', F(n+2)',—in the case of reading from the field memory 15. The digital compressed luminance signal segments F(n−1)', F(n)', F(n+1)', F(n+2)',—are intermittently obtained from the field memory 15 to form a digital compressed luminance signal DY' in the aggregate, as shown in FIG. 2B, and the digital compressed luminance signal DY' is supplied to a digital to analog (D/A) converter 23.

Each of digital field period segments of the digital color difference signal DR is temporarily written in the field memory 18 in accordance with the writing clock pulse signal PW and then read from the field memory 18 in accordance with the reading clock pulse signal PR. The digital field period segments of the digital color difference signal DR are successively subjected to time base compression at the compression rate of ¾ to produce digital compressed color difference signal segments DR' in the case of reading from the field memory 18. The digital compressed color difference signal segments DR' are intermittently obtained from the field memory 18 to supplied to an encoder 24. Similarly, each of field period segments of the digital color difference signal DB is temporarily written in the field memory 19 in accordance with the writing clock pulse signal PW and then read from the field memory 19 in accordance with the reading clock pulse signal PR. The field period segments of the digital color difference signal DB are successively subjected to time base compression at the compression rate of ¾ to produce digital compressed color difference signal segments DB' in the case of reading from the field memory 19. The digital compressed color difference signal segments DB' are intermittently obtained from the field memory 19 to be supplied to the encoder 24. In the encoder 24, the digital compressed color difference signal segments DR' and the digital compressed color difference signal segments DB' are combined to form digital compressed chrominance signal DC' appearing intermittently, and the digital compressed chrominance signal DC' is supplied to a D/A converter 25.

Each of digital field period segments of the digital audio signal DA is temporarily written in the field memory 21 in accordance with the writing clock pulse signal PW and then read from the field memory 21 in accordance with the reading clock pulse signal PR. The digital field period segments of the digital audio signal DA are successively subjected to time base compression at the compression rate of ¾ to produce digital compressed audio signal segments in the case of reading from the field memory 21 to form a digital compressed audio signal DA' in the aggregate, and the digital compressed audio signal DA' is supplied to a D/A converter 26.

The digital compressed luminance signal DY' is converted to an analog signal to produce a compressed luminance signal Y' by the D/A converter 23 and the compressed luminance signal Y' is supplied to a luminance signal recording processor 27. In the luminance signal recording processor 27, the compressed luminance signal Y' is used for frequency-modulating a predetermined carrier signal to produce a frequency-modulated compressed luminance signal Yf' having a carrier frequency deviation band defined by a lowest frequency component of 5.6 MHz corresponding to a peak portion of the synchronous signal of the compressed luminance signal Y' and a highest frequency component of 7.2 MHz corresponding to a white peak portion of the compressed luminance signal Y'. The frequency-modulated compressed luminance signal Yf' is derived from the luminance signal recording processor 27 through a high pass filter (HPF) 28 having a cutoff frequency of, for example, approximately 2.7 MHz to be supplied a signal mixing portion 29.

The digital compressed chrominance signal DC' is converted to an analog signal to produce a compressed chrominance signal C' by the D/A converter 25 and the compressed chrominance signal C' is supplied to a chrominance signal recording processor 30. In the chrominance signal recording processor 30, the compressed chrominance signal C' is frequency-converted into a lower frequency band to produce a frequency-converted compressed chrominance signal Cc' having a color subcarrier frequency of, for example, approximately 990 KHz. The frequency-converted compressed chrominance signal Cc' is derived from the chrominance signal recording processor 30 through a band pass filter (BPF) 31 to be supplied the signal mixing portion 29.

The digital compressed audio signal DA' is converted to an analog signal to produce a compressed audio signal AU' by the D/A converter 26 and the compressed audio signal AU' is supplied to an audio signal recording processor 32. In the audio signal recording processor 32, the compressed audio signal AU' is used for frequency-modulating a predetermined carrier signal to produce a frequency-modulated compressed audio signal Af' having a carrier frequency deviation band of ±150 to 200 KHz. The frequency-modulated compressed audio signal Af' is derived from the audio signal recording processor 32 through a BPF 33 having a pass band of, for example, approximately 2.0 MHz to be supplied the signal mixing portion 29.

In the signal mixing portion 29, the frequency-modulated compressed luminance signal Yf' obtained through the HPF 28, the frequency-converted compressed chrominance signal Cc' obtained through the BPF 31, and the frequency-modulated compressed audio signal Af' obtained through the BPF 33 are mixed in the frequency multiplex manner to produce a composite recording signal Sm. The composite recording signal Sm is composed of compressed field period segments, each of which comprises a field period segment of the frequency-modulated compressed luminance signal Yf', a field period segment of the frequency-converted compressed chrominance signal Cc' and a field period segment of the frequency-modulated compressed audio signal Af' mixed in the frequency multiplex manner and which are intermittently derived from the signal mixing portion 29 to be supplied to a movable contact 34a of a switch 34. The switch 34 is controlled by a switch control signal SW applied to a control terminal 35 to cause the movable contact 34a to be connected alternately with fixed contacts 34b and 34c during each period wherein the compressed field period segment of the composite recording signal Sm is obtained. The fixed contacts 34b and 34c are connected with recording amplifiers 36 and 37, respectively, and therefore the compressed field period segments of the composite recording signal Sm are supplied alternately to the recording amplifiers 36 and 37 through the switch 34.

Every other compressed field period segment of the composite recording signal Sm is supplied to the recording amplifier 36 and is applied to a magnetic gap portion 41 of a double-gap rotary magnetic head 40 which is provided with a pair of magnetic gap portions having respective gap azimuths different from each other, one of which is the magnetic gap portion 41 and the other of which is a magnetic gap portion 42, and another every other compressed field period segment of the composite recording signal Sm is supplied to the recording amplifier 37 an is applied to the magnetic gap portion 42 of the double-gap rotary magnetic head 40. The double-gap rotary magnetic head 40 is attached to a rotary portion of a tape guide cylinder 43 to be disposed between the rotary portion and a stationary portion of the tape guide cylinder 43 and rotated in company with the rotary portion of the tape guide cylinder 43. Each of the magnetic gap portions 41 and 42 of the double-gap rotary magnetic head 40 is slightly projected from the periphery of the tape guide cylinder 43 to come into contact with a magnetic tape 45 running on the periphery of the tape guide cylinder 43 for scanning the magnetic tape 45 in a direction at a predetermined angle of inclination to a direction along which the magnetic tape 45 moves.

The magnetic tape 45 is driven by a capstan 47 rotated by a capstan driving motor 46 and a pinch roller 48 facing the capstan 47 with the magnetic tape 45 between. The capstan driving motor 46 is controlled by a capstan servocontrol circuit 49 to cause the magnetic tape 45 to run at a predetermined speed. The rotary portion of the tape guide cylinder 43 to which the double-gap rotary magnetic head 40 is attached is driven by a cylinder driving motor 50 which is controlled by a cylinder servocontrol circuit 51 to cause the rotary portion of the tape guide cylinder 43 to rotate at a predetermined speed.

The diameter of the tape guide cylinder 43, a tape wrapping angle on the periphery of the tape guide cylinder 43, and the cylinder revolving speed, namely, the revolving speed of the double-gap rotary magnetic head 40 are selected with reference to a standard video tape recorder which is equipped with a standard tape guide cylinder having its diameter of 40 mm and a standard rotary magnetic head device having two magnetic gap portions and in which a tape wrapping angle on the standard tape guide cylinder is selected to be 180 degrees and the cylinder revolving speed, namely, the revolving speed of the standard rotary magnetic head device is selected to be approximately 29.97 rps. That is, the diameter of the tape guide cylinder 43 is selected to be two-thirds times as small as that of the standard tape guide cylinder, namely, approximately 26.67 mm, the tape wrapping angle on the periphery of the tape guide cylinder 43 is selected to be three halves times as large as that on the periphery of the standard tape guide cylinder, namely, 270 degrees, and the revolving speed of the double-gap rotary magnetic head 40 is selected to be twice as high as that of the standard rotary magnetic head device, namely, approximately 59.94 rps.

With the configuration mentioned above, each of the compressed field period segments of the composite recording signal Sm supplied alternately to the magnetic gap portions 41 and 42 of the double-gap rotary magnetic head 40 is recorded in a record track on the magnetic tape 45, which is formed to extend along a direction at a predetermined angle of inclination to the longitudinal direction of the magnetic tape 45 during each period in which each of the magnetic gap portions 41 and 42 scans the magnetic tape 45.

Under a condition wherein the above mentioned selections or arrangements are made, assuming that AA represents the ratio of the diameter of the tape guide cylinder 43 to the diameter of the standard tape guide cylinder, BB represents the ratio of the tape wrapping angle on the periphery of the tape guide cylinder 43 to the tape wrapping angle on the periphery of the standard tape guide cylinder, CC represents the ratio of the revolving speed of the double-gap rotary magnetic head 40 to the revolving speed of the standard rotary magnetic head device, and EE represents the compression rate of time base compression rendered to the composite recording signal Sm, in the case of the embodiment shown in FIG. 1, which is equipped with the double-gap rotary magnetic head 40 having two magnetic gap portion 41 and 42, it is required, for forming a record track having its length coincident with the length of each record track formed on a magnetic tape by the standard video tape recorder and for making the period of the field period segment of the composite recording signal Sm recorded on the magnetic tape 45 coincident with the period of a field period segment of a video signal recorded on the magnetic tape by the standard video tape recorder, in order to have compatibility with the standard video tape recorder, to satisfy the following two equations:

$$AA \cdot BB = 1 \tag{a}$$

$$BB/(CC \cdot EE) = 1 \tag{b}$$

Corroborating actually AA, BB, CC and EE in the embodiment shown in FIG. 1, the following equations are obtained:

$$AA = \tfrac{2}{3},\ BB = 3/2,\ CC = 2,\ \text{and}\ EE = \tfrac{3}{4}$$

Accordingly, the equations (a) and (b) are surely satisfied. This means that the embodiment shown in FIG. 1 provides such a video tape recorder that is operative to record a color television signal composed of a video signal including luminance and chrominance signals and an audio signal on a magnetic tape under a condition wherein compatibility in the recording operation with the standard video tape recorder is obtained without increasing the number of magnetic gap portions of a rotary magnetic head device.

Figure 3:
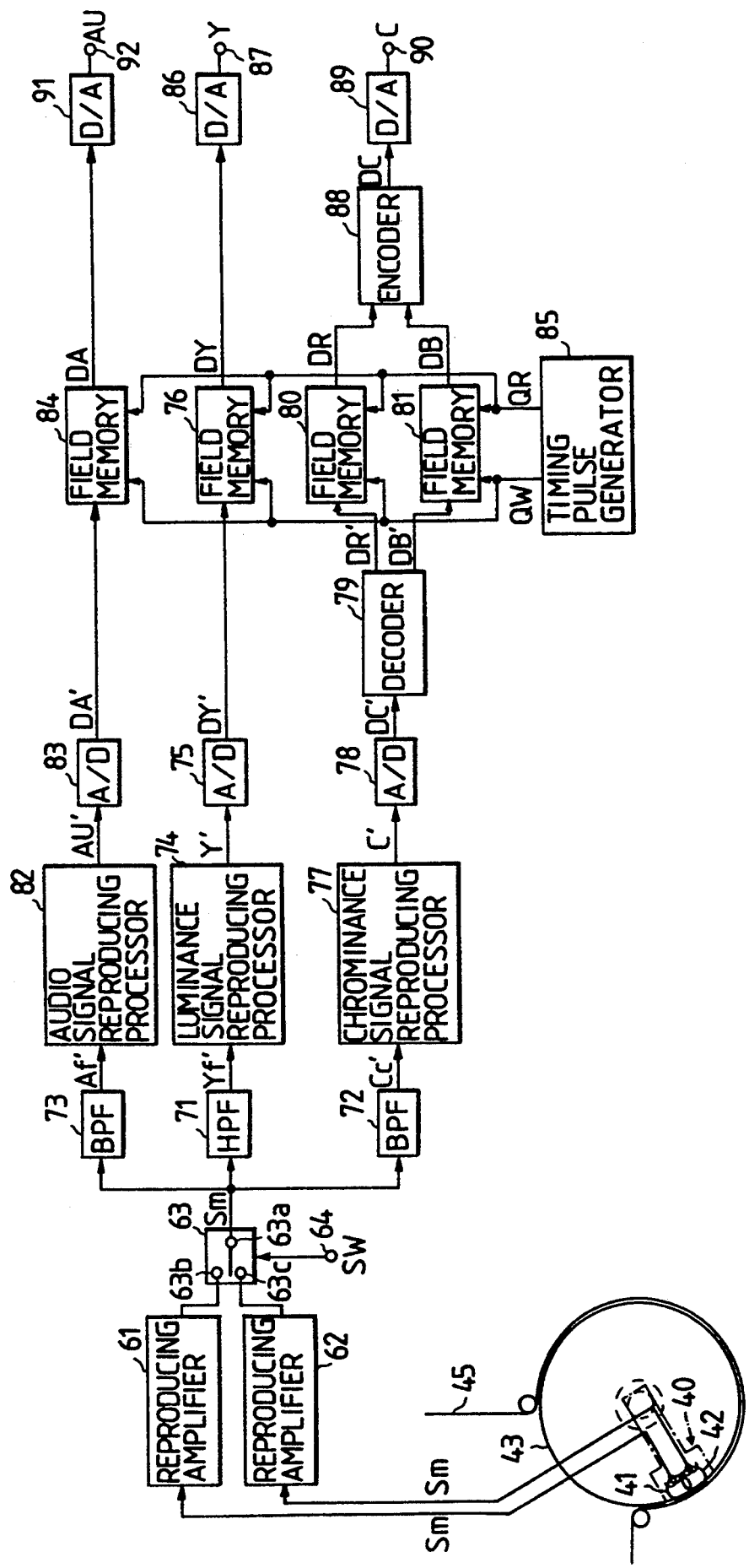
FIG. 3 is a block diagram showing an embodiment a magnetic reproducing apparatus according to the present invention.

FIG. 3 shows an embodiment of a magnetic reproducing apparatus according to the present invention, which is operative to reproduce the luminance, chrominance and audio signals constituting the color television signal from the magnetic tape 45 on which the composite recording signal Sm is recorded by the embodiment of the magnetic recording apparatus shown in FIG. 1.

In the embodiment shown in FIG. 3, the double-gap rotary magnetic head 40 and the tape guide cylinder 43, both of which are employed in the embodiment shown in FIG. 1, are also employed to be used for reading the composite recording signal Sm from the magnetic tape 45.

Referring to FIG. 3, the rotary portion of the tape guide cylinder 43 is driven to revolve in the same manner as that in case of the recording operation and the magnetic tape 45 is driven to run in the same manner as that in case of the recording operation. Under such a condition, the magnetic gap portion 41 of the double-gap rotary magnetic head 40 is operative to read the compressed field period segment of the composite recording signal Sm from each record track formed on the magnetic tape 45 in the recording operation by the magnetic gap portion having the corresponding gap azimuth, and similarly the magnetic gap portion 42 of the double-gap rotary magnetic head 40 is operative to read the compressed field period segment of the composite recording signal Sm from each record track formed on the magnetic tape 45 in the recording operation by the magnetic gap portion having the corresponding gap azimuth. The compressed field period segments of the composite recording signal Sm read from the magnetic tape 45 alternatively by the magnetic gap portions 41 and 42 of the double-gap rotary magnetic head 40 are supplied through reproducing amplifiers 61 and 62 to fixed contacts 63b and 63c of a switch 63.

The switch 63 is controlled by a switch control signal SW applied to a control terminal 64 to cause the movable contact 63a to be connected alternately with fixed contacts 63b and 63c during each period wherein the compressed field period segment of the composite recording signal Sm read from the magnetic tape 45 is obtained. Therefore, the compressed field period segments of the composite recording signal Sm read from the magnetic tape 45 are derived from the movable contact 63a of the switch 63 in the form of the composite recording signal Sm reproduced continuously.

The composite recording signal Sm obtained from the switch 63 is supplied to a HPF 71 for a frequency-modulated compressed luminance signal Yf', a BPF 72 for a frequency-converted compressed chrominance signal Cc', and a BPF 73 for a frequency-modulated compressed audio signal Af'. The frequency-modulated compressed luminance signal Yf' is extracted from the composite recording signal Sm by the HPF 71 to be supplied to a luminance signal reproducing processor 74. In the luminance signal reproducing processor 74, the frequency-modulated compressed luminance signal Yf' is subjected to frequency-demodulation and other signal treatments to produce a compressed luminance signal Y'. The compressed luminance signal Y' obtained from the luminance signal reproducing processor 74 is supplied to an A/D converter 75 to be digitalized thereby and a digital compressed luminance signal DY' is obtained from the A/D converter 75 to be supplied to a field memory 76.

The frequency-converted compressed chrominance signal Cc' is extracted from the composite recording signal Sm by the BPF 72 to be supplied to a chrominance signal reproducing processor 77. In the chrominance signal reproducing processor 77, the frequency-converted compressed chrominance signal Cc' is subjected to frequency-conversion and other signal treatments to produce a compressed chrominance signal C'.

The compressed chrominance signal C' obtained from the chrominance signal reproducing processor 77 is supplied to an A/D converter 78 to be digitalized thereby and a digital compressed chrominance signal DC' is obtained from the A/D converter 78 to be supplied to a decoder 79. In the decoder 79, digital compressed color difference signal segments DR' and DB' are separately extracted from the digital compressed chrominance signal DC'. A signal formed with the digital compressed color difference signal segments DR' obtained from the decoder 79 to be read intermittently is supplied to field memory 80 and a signal formed with the digital compressed color difference signal segments DB' obtained from the decoder 79 to be read intermittently is supplied to field memory 81.

Further, the frequency-modulated compressed audio signal Af' is extracted from the composite recording signal Sm by the BPF 73 to be supplied to an audio signal reproducing processor 82. In the audio signal reproducing processor 82, the frequency-modulated compressed audio signal Af' is subjected to frequency-demodulation and other signal treatments to produce a compressed audio signal AU'. The compressed audio signal AU' obtained from the audio signal reproducing processor 82 is supplied to an A/D converter 83 to be digitalized thereby and a digital compressed audio signal DA' is obtained from the A/D converter 83 to be supplied to a field memory 84.

A writing clock pulse signal QW having a predetermined frequency 4·ft/3 and a reading clock pulse signal QR having a frequency ft, both of which are obtained from a timing pulse generator 85, are selectively supplied to each of the field memories 76, 80, 81 and 84. Each of digital compressed luminance signal segments F(n−1)', F(n)', F(n+1)', F(n+2)',—of the digital compressed luminance signal DY', which forms a field period segment of the digital compressed luminance signal DY', as shown in FIG. 2C, is temporarily written in the field memory 76 in accordance with the writing clock pulse signal QW and then read from the field memory 76 in accordance with the reading clock pulse signal QR. Since the frequency ft of the reading clock pulse signal QR is ¾ times as low as the frequency 4·ft/3 of the writing clock pulse signal QW, the digital compressed luminance signal segments F(n−1)', F(n)', F(n+1)', F(n+2)',—of the digital compressed luminance signal DY' are successively subjected to time base expansion at the expansion rate of 4/3 to produce digital field period segments F(n−1), F(n), F(n+1), F(n+2),—in the case of reading from the field memory 76.

The digital field period segments F(n−1), F(n), F(n+1), F(n+2),—are successively obtained from the field memory 76 to form a digital luminance signal DY in the aggregate, as shown in FIG. 2D, and the digital luminance signal DY is supplied to a D/A converter 86. The digital luminance signal DY is converted to an analog signal to produce a luminance signal Y by the D/A converter 86 and the luminance signal Y is derived from a video signal output terminal 87 as a reproduced luminance signal.

Each of the digital compressed color difference signal segments DR' is temporarily written in the field memory 80 in accordance with the writing clock pulse signal QW and then read from the field memory 80 in accordance with the reading clock pulse signal QR. The digital compressed color difference signal segments DR' are successively subjected to time base expansion at the expansion rate of 4/3 to produce digital field period segments in the case of reading from the field memory 80. The digital field period segments are successively obtained from the field memory 80 to produce a digital color difference signal DR and the digital color difference signal DR is supplied to an encoder 88.

Similarly, each of the digital compressed color difference signal segments DB' is temporarily written in the field memory 81 in accordance with the writing clock pulse signal QW and then read from the field memory 81 in accordance with the reading clock pulse signal QR. The digital compressed color difference signal segments DB' are successively subjected to time base expansion at the expansion rate of 4/3 to produce digital field period segments in the case of reading from the field memory 81. The digital field period segments are successively obtained from the field memory 81 to produce a digital color difference signal DB and the digital color difference signal DB is supplied to the encoder 88.

In the encoder 88, the digital color difference signal DR and the digital color difference signal DB are combined to form a digital chrominance signal DC and the digital chrominance signal DC is supplied to a D/A converter 89. The digital chrominance signal DC is converted to an analog signal to produce a chrominance signal C by the D/A converter 89 and the chrominance signal C is derived from a video signal output terminal 90 as a reproduced luminance signal.

Each of the digital compressed audio signal segments of the digital compressed audio signal DA', which forms a field period segment of the digital compressed audio signal DA', is temporarily written in the field memory 84 in accordance with the writing clock pulse signal QW and then read from the field memory 84 in accordance with the reading clock pulse signal QR. Since the frequency ft of the reading clock pulse signal QR is three quarters times as low as the frequency 4·ft/3 of the writing clock pulse signal QW, the digital compressed audio signal segments of the digital compressed audio signal DA' are successively subjected to time base expansion at the expansion rate of 4/3 to produce digital field period segments in the case of reading from the field memory 84.

The digital field period segments obtained successively from the field memory 84 form a digital audio signal DA in the aggregate and the digital audio signal DA is supplied to a D/A converter 91. The digital audio signal DA is converted to an analog signal to produce an audio signal AU by the D/A converter 91 and the audio signal AU is derived from an audio signal output terminal 92 as a reproduced audio signal.

As described above, the embodiment a magnetic reproducing apparatus shown in FIG. 3, which is operative to reproduce the luminance signal Y, chrominance signal C and audio signal AU from the magnetic tape 45, is compatible the reproducing operation with the standard video tape recorder. Further, with the embodiment of the magnetic reproducing apparatus shown in FIG. 3, since a single double-gap rotary magnetic head 40 is provided at the inside of the tape guide cylinder 43, which has its diameter smaller than that of the standard tape guide cylinder employed in the standard video tape recorder, it is easy to dispose additional rotary magnetic heads used for reproducing the video signal from the magnetic tape 45 in a trick play mode, for example, a cue reproduction mode, review reproduction mode or still picture reproduction mode, in the inside of the tape guide cylinder 43 and therefore a so-called noiseless cue reproduction, noiseless review reproduction or noiseless still picture reproduction can be easily performed.

Although, the double-gap rotary magnetic head 40 is attached to the rotary portion of the tape guide cylinder 43 in the embodiments shown in FIGS. 1 and 3, it is also possible to use, in place of the double-gap rotary magnetic head 40, two single-gap rotary magnetic heads which are attached to the rotary portion of the tape guide cylinder 43 to be spaced from each other at an angular interval of about 180 degrees. In the case where two single-gap rotary magnetic heads are used, the cylinder revolving speed, namely, the revolving speed of each single-gap rotary magnetic head is selected to be, for example, three times as high as that in the standard video tape recorder, namely, approximately 89.91 rps (3×29.97 rps), and the compression rate for time base compression of each of the luminance, chrominance and audio signals is selected to be ½ in the recording operation, so that AA, BB, CC and EE are determined to be ⅔, 3/2, 3 and ½, respectively, and the equations: AA·BB=1 and BB/(CC·EE)=1 are satisfied.

What is claimed is:

1. A magnetic reproducing apparatus comprising:
   time base compressing means for subjecting a video signal to time base compression at a predetermined compression rate to produce a video signal with a compressed time base;
   recording signal producing means for forming a recording video signal based on the video signal with a compressed time base from said time base compressing means;
   tape guide cylinder means having a periphery thereof providing a running path for a magnetic tape applied to wrap around a part of the periphery of said tape guide cylinder means at a predetermined wrapping angle;
   a rotary magnetic head device disposed in said tape guide cylinder means and having magnetic gap portions projecting slightly from the periphery of said tape guide cylinder means to make contact with the magnetic tape on the periphery of said tape guide cylinder means; and
   recording signal supplying means for supplying said rotary magnetic head device with the recording video signal;
   wherein, given that $\alpha$ represents the diameter of a standard tape guide cylinder employed in a standard apparatus for recording by a standard rotary magnetic head a video signal having an uncompressed time base on a magnetic tape running on the periphery of the standard tape guide cylinder, $\beta$ represents a tape wrapping angle on the periphery of the standard tape guide cylinder, $\gamma$ represents the revolving speed of the standard rotary magnetic head device, $\delta$ represents the number of magnetic gap portions of the standard rotary magnetic head device, AA represents the ratio of the diameter of the tape guide cylinder means to the diameter of the standard tape guide cylinder, BB represents the ratio of the tape wrapping angle on the periphery of the tape guide cylinder means to the tape wrapping angle on the periphery of the standard tape guide cylinder, CC represents the ratio of the revolving speed of the rotary magnetic head device to the revolving speed of the standard rotary magnetic head device, and EE represents the compression rate of time base compression of the video signal, then:

the diameter of said tape guide cylinder means is selected to be $X \cdot \alpha$, where X is a positive number smaller than 1, the tape wrapping angle around the tape guide cylinder means is selected to be $\beta/X$, the revolving speed of said rotary magnetic head device is selected to be $Z \cdot \gamma$, where Z is a positive integer larger than 1 and smaller than 4, and the number of magnetic gap portions of said rotary magnetic head is selected to be $\delta$, $AA \cdot BB = 1$ and $BB/(CC \cdot EE) = 1$.

2. A magnetic recording apparatus according to claim 1, wherein $\beta$ is substantially 180 degrees, X is substantially $\frac{2}{3}$, Z is 2 and $\delta$ is 2.

3. A magnetic recording apparatus according to claim 1, wherein $\beta$ is substantially 180 degrees, X is substantially $\frac{2}{3}$, Z is 3 and $\delta$ is 2.

4. A magnetic recording apparatus according to claim 1, wherein said rotary magnetic head device further comprises a double-gap rotary magnetic head.

5. A magnetic reproducing apparatus comprising:
tape guide cylinder means having a periphery thereof providing a running path for a magnetic tape on which a time base compressed video signal is recorded and which is applied to wrap around a part of the periphery of said tape guide cylinder means at a predetermined wrapping angle;

a rotary magnetic head device disposed in said tape guide cylinder means and having magnetic gap portions projecting slightly from the periphery of said the tape guide cylinder means to make contact with the magnetic tape on the periphery of said tape guide cylinder means;

video signal reproducing means for reproducing a video signal from the time base compressed video signal read from the magnetic tape by said rotary magnetic head device; and time base expanding means for subjecting the video signal with compressed time base to time base expansion at a predetermined expansion rate to produce a reproduced video signal;

wherein, when given that $\alpha$ represents the diameter of a standard tape guide cylinder in a standard apparatus for reproducing with a standard rotary magnetic head a normal, uncompressed time base video signal from a magnetic tape running on the periphery of the standard tape guide cylinder, $\beta$ represents a tape wrapping angle on the periphery of the standard tape guide cylinder, $\gamma$ represents the revolving speed of the standard rotary magnetic head device, $\delta$ represents the number of magnetic gap portions of the standard rotary magnetic head, AA represents the ratio of the diameter of the tape guide cylinder means to the diameter of the standard tape guide cylinder, BB represents the ratio of the tape wrapping angle on the periphery of the tape guide cylinder means to the tape wrapping angle on the periphery of the standard tape guide cylinder, CC represents the ratio of the revolving speed of the rotary magnetic head device to the revolving speed of the standard rotary magnetic head device, and EE represents the compression rate of time base compression of the video signal, then:

the diameter of said tape guide cylinder means is selected to be $X \cdot \alpha$, where X is a positive number smaller than 1, the tape wrapping angle around the tape guide cylinder means is selected to be $\beta/X$, the revolving speed of said rotary magnetic head device is selected to be $Z \cdot \gamma$, where Z is a positive integer larger than 1 and smaller than 4, and the number of magnetic gap portions of said rotary magnetic head is selected to be $\delta$, $AA \cdot BB = 1$ and $BB/(CC \cdot EE) = 1$.

6. A magnetic recording apparatus according to claim 5, wherein $\beta$ is substantially 180 degrees, X is substantially $\frac{2}{3}$, Z is 2 and $\delta$ is 2.

7. A magnetic recording apparatus according to claim 5, wherein $\beta$ is substantially 180 degrees, X is substantially $\frac{2}{3}$, Z is 3 and $\delta$ is 2.

8. A magnetic recording apparatus according to claim 5, wherein said rotary magnetic head device further comprises a double-gap rotary magnetic head.

* * * * *

UNITED STATES PATENT AND TRADEMARK OFFICE
CERTIFICATE OF CORRECTION

PATENT NO. : 5,337,192
DATED : August 9, 1994
INVENTOR(S) : Hideki Fukasawa, Shuichi Ota, and Hiroshi Okada It is certified that error appears in the above-indentified patent and that said Letters Patent is hereby corrected as shown below:

```
Col.  2, lines 20 & 21, delete "to constitute to constitute"
Col.  3, line 1, after "portions," insert --an--
Col.  6, line 25, after "embodiment" insert --of--
         line 31, after "embodiment" insert --of--
Col. 13, line 55, after "compatible" insert --in--

Col. 14, line 23, change "reproducing" to --recording--
Col. 15, line 3, change "the" second occurrence to --said--
         line 41, change "wherein ," to --wherein,--
```

Signed and Sealed this

Seventh Day of May, 1996

Attest:

BRUCE LEHMAN

*Attesting Officer*   *Commissioner of Patents and Trademarks*